United States Patent
Onikura et al.

(10) Patent No.: US 11,413,654 B2
(45) Date of Patent: Aug. 16, 2022

(54) ULTRASONIC VIBRATION PROCESSING DEVICE

(71) Applicants: KIRA CORPORATION, Nishio (JP); UNIVERSITY OF MIYAZAKI, Miyazaki (JP); THE UNIVERISITY OF KITAKYUSHU, Kitakyushu (JP)

(72) Inventors: Hiromichi Onikura, Fukuoka (JP); Osamu Ohnishi, Miyazaki (JP); Hiroshi Murakami, Kitakyushu (JP)

(73) Assignees: KIRA CORPORATION, Nishio (JP); UNIVERSITY OF MIYAZAKI, Miyazaki (JP); THE UNIVERISITY OF KITAKYUSHU, Kitakyushu (JP)

( * ) Notice: Subject to any disclaimer, the term of this patent is extended or adjusted under 35 U.S.C. 154(b) by 180 days.

(21) Appl. No.: 16/616,738

(22) PCT Filed: Jul. 17, 2018

(86) PCT No.: PCT/JP2018/026660
§ 371 (c)(1),
(2) Date: Nov. 25, 2019

(87) PCT Pub. No.: WO2019/026601
PCT Pub. Date: Feb. 7, 2019

(65) Prior Publication Data
US 2020/0180041 A1    Jun. 11, 2020

(30) Foreign Application Priority Data

Aug. 3, 2017   (JP) .............................. JP2017-150387

(51) Int. Cl.
*B23B 29/12*    (2006.01)
*B23B 37/00*    (2006.01)
(Continued)

(52) U.S. Cl.
CPC .......... *B06B 1/0611* (2013.01); *B23B 29/125* (2013.01); *B23B 37/00* (2013.01);
(Continued)

(58) Field of Classification Search
CPC ................ B23B 37/00; B23B 2270/10; B23B 2260/108; B23B 29/125; B23B 2260/008;
(Continued)

(56) References Cited

U.S. PATENT DOCUMENTS 3,561,462 A * 2/1971 Jugler ....................... B06B 1/06
                                                   173/199
3,608,648 A * 9/1971 Dibble, Jr. ............. B28D 1/041
                                                   173/199
(Continued)

FOREIGN PATENT DOCUMENTS

JP      08224728 A  *  9/1996
JP    2002-219606 A     8/2002
(Continued)

OTHER PUBLICATIONS

Machine Translation, RU2250814. (Year: 2005).*
International Search Report for PCT/JP2018/026660, dated Sep. 25, 2018 (4 pgs. with English translation).

*Primary Examiner* — Eric A. Gates
*Assistant Examiner* — Chwen-Wei Su
(74) *Attorney, Agent, or Firm* — Smith, Gambrell & Russell, LLP

(57) ABSTRACT

Provided is an ultrasonic vibration processing device which can suppress vibration of components due to an ultrasonic vibrator and can perform processing using ultrasonic vibration in a preferable manner; the ultrasonic vibration processing device includes: a housing (10); an ultrasonic vibrator (20) including a horn portion (21A) to which a tool holder (70) is detachably attached and a piezoelectric element (23), the ultrasonic vibrator having a rear end located (Continued)

at a node of ultrasonic vibration and being supported inside the housing (10) so as to be rotatable; a connecting portion (30) stored in the housing (10) so as to be rotatable together with the ultrasonic vibrator (20); a motor (40) connected to the connecting portion (30); and a non-contact power supply unit (50) including a primary transformer (51) and a secondary transformer (52), the primary transformer (51) being fixed to the housing (10) and including a primary coil (51B) that receives high frequency power from an external power supply, the secondary transformer (52) being connected to the rear end of the ultrasonic vibrator (20) with a clearance maintained between the secondary transformer (52) and the primary transformer (51) and including a secondary coil (52B) that supplies an induced electromotive force to the piezoelectric element (23).

17 Claims, 4 Drawing Sheets

(51) Int. Cl.
*B06B 1/06* (2006.01)
*B23C 5/00* (2006.01)
(52) U.S. Cl.
CPC ... *B23B 2260/008* (2013.01); *B23B 2260/108* (2013.01); *B23B 2270/10* (2013.01); *B23C 5/003* (2013.01); *B23C 2270/10* (2013.01)

(58) Field of Classification Search
CPC ....... B23C 2270/10; B23C 5/003; B23Q 1/34; B06B 1/0611
See application file for complete search history.

(56) References Cited

U.S. PATENT DOCUMENTS

| | | | | |
|---|---|---|---|---|
| 4,073,498 | A * | 2/1978 | Derbyshire | B23B 31/1238 279/158 |
| 6,204,592 | B1 * | 3/2001 | Hur | A61B 17/1624 310/323.18 |
| 7,824,247 | B1 * | 11/2010 | Bar-Cohen | B23B 37/00 451/165 |
| 9,689,391 | B2 * | 6/2017 | Fu | F04C 29/063 |
| 2016/0129542 | A1 | 5/2016 | Chen et al. | |
| 2019/0351452 | A1 * | 11/2019 | Ohnishi | B06B 1/0607 |

FOREIGN PATENT DOCUMENTS

| | | | |
|---|---|---|---|
| JP | 2002-346817 | A | 12/2002 |
| JP | 2009-241226 | A | 10/2009 |
| JP | 2010-207972 | A | 9/2010 |
| JP | 2011-131343 | A | 7/2011 |
| JP | 2016-87789 | A | 5/2016 |
| RU | 2250814 | C1 * | 4/2005 |

* cited by examiner (A)

(B)

ULTRASONIC VIBRATION PROCESSING DEVICE

TECHNICAL FIELD

The present invention relates to an ultrasonic vibration processing device.

BACKGROUND ART

An ultrasonic vibration processing device in Patent Literature 1 includes a housing, a spindle, a tool holder, an ultrasonic vibrator, and a non-contact power supply unit. The spindle is supported inside the housing so as to be rotatable around a rotation axis. The tool holder is connected to a distal end of the spindle, and a cutting/grinding tool is attached to the tool holder. The ultrasonic vibrator vibrates the cutting/grinding tool via the tool holder. The non-contact power supply unit supplies high frequency power to the ultrasonic vibrator. The non-contact power supply unit includes a primary transformer, a secondary transformer, and a clearance maintaining mechanism for maintaining a set clearance between the primary transformer and the secondary transformer. The primary transformer has a primary coil which receives high frequency power from an external power supply. The secondary transformer has a secondary coil which generates induced electromotive force between itself and the primary coil by electromagnetic induction.

In the ultrasonic vibration processing device, the clearance maintaining mechanism maintains the set clearance between the primary transformer and the secondary transformer even when a length of the spindle changes due to heat generated from the ultrasonic vibrator or the like. Accordingly, in the ultrasonic vibration processing device, induced electromotive force is generated at the secondary coil of the non-contact power supply unit in a stable manner. Therefore, the ultrasonic vibration processing device can supply high frequency power to the ultrasonic vibrator in a stable manner, with the result that processing using ultrasonic vibration can be performed in a preferable manner.

CITATION LIST

Patent Literature

Patent Literature 1: JP 2011-131343 A

SUMMARY OF INVENTION

Technical Problems

According to the ultrasonic vibration processing device in Patent Literature 1, however, a drive motor for rotationally driving the spindle is constituted of a stator provided on an inner circumferential surface of the housing and a rotor provided on an outer circumferential surface of the spindle. Accordingly, the length of the spindle increases, and therefore ultrasonic vibration energy may not be efficiently transmitted to the tool side.

Furthermore, in the ultrasonic vibration processing device in Patent Literature 1, it is not considered that the secondary transformer is vibrated due to vibration of the ultrasonic vibrator. Therefore, in the ultrasonic vibration processing device, induced electromotive force generated at the secondary coil may be unstable due to the vibration of the secondary transformer by the ultrasonic vibrator.

The present invention has been developed in view of the above-described conventional circumstances. A problem to be solved by the present invention is to provide an ultrasonic vibration processing device that can suppress vibration of components due to an ultrasonic vibrator and can perform processing using ultrasonic vibration in a preferable manner.

Solutions to Problems

An ultrasonic vibration processing device according to a first invention includes:

a housing;

an ultrasonic vibrator including a horn portion having a distal end portion to which a tool holder is detachably attached and a piezoelectric element held at an intermediate portion in a direction of a rotation axis, the ultrasonic vibrator having a rear end located at a node of ultrasonic vibration generated by the piezoelectric element, the ultrasonic vibrator being supported inside the housing so as to be rotatable around the rotation axis;

a connecting portion having a front end portion connected to a rear end portion of the ultrasonic vibrator, and stored in the housing so as to be rotatable around the rotation axis together with the ultrasonic vibrator;

a rotational driving unit connected to a rear end portion of the connecting portion; and a non-contact power supply unit including a primary transformer and a secondary transformer, the primary transformer being fixed to the housing and including a primary coil that receives high frequency power from an external power supply, the secondary transformer being connected to a rear end of the ultrasonic vibrator with a clearance maintained between the secondary transformer and the primary transformer, the secondary transformer being configured to be rotated around the rotation axis together with the ultrasonic vibrator and including a secondary coil that supplies an induced electromotive force generated between the secondary coil and the primary coil by electromagnetic induction, to the piezoelectric element.

An ultrasonic vibration processing device according to a second invention includes:

a housing;

an ultrasonic vibrator including a horn portion having a distal end portion to which a tool holder is detachably attached and a piezoelectric element held at an intermediate portion in a direction of a rotation axis, the ultrasonic vibrator being supported inside the housing so as to be rotatable around the rotation axis;

a connecting portion having a front end portion connected to a rear end portion of the ultrasonic vibrator, and stored in the housing so as to be rotatable around the rotation axis together with the ultrasonic vibrator, the connecting portion including a spline bearing having an insertion opening opened at a rear end of the connecting portion;

a rotational driving unit including a spline shaft that is inserted into the spline bearing through the insertion opening of the connecting portion and rotatable around the rotation axis, the rotational driving unit being connected to a rear end portion of the connecting portion; and a non-contact power supply unit including a primary transformer and a secondary transformer, the primary transformer being fixed to the housing and including a primary coil that receives high frequency power from an external power supply, the secondary transformer being connected to a rear end of the ultrasonic vibrator with a clearance maintained between the secondary transformer and the primary transformer, the secondary transformer being configured to be rotated around the rotation axis together with the ultrasonic vibrator and including a secondary coil that supplies an induced electromotive force generated between the secondary coil and the primary coil by electromagnetic induction, to the piezoelectric element.

BRIEF DESCRIPTION OF DRAWINGS

FIGS. 3(A) and 3(B) show a spline bearing of a connecting portion and a spline shaft formed on a drive shaft of a motor in the ultrasonic vibration processing device according to the first embodiment, wherein: FIG. 3(A) is a cross-sectional view; and a FIG. 3(B) is an exploded perspective view.

DESCRIPTION OF EMBODIMENTS

A preferred embodiment of the present invention will be described.

In the ultrasonic vibration processing device of the second invention, the spline bearing may be located at a node of ultrasonic vibration generated by the piezoelectric element.

In the ultrasonic vibration processing device of the second invention, surface hardening treatment may be performed on an inner circumferential surface of the spline bearing and an outer circumferential surface of the spline shaft.

The ultrasonic vibration processing device of the first invention and the second invention may further include a reflecting member that is held between the rear end of the ultrasonic vibrator and the secondary transformer and has a specific acoustic impedance different from a specific acoustic impedance of the ultrasonic vibrator.

In the ultrasonic vibration processing device of the first invention and the second invention, a specific acoustic impedance of the connecting portion and a specific acoustic impedance of the ultrasonic vibrator may be different from each other.

An ultrasonic vibration processing device according to a first embodiment of the present invention will be described with reference to the drawings.

First Embodiment

Figure 1:
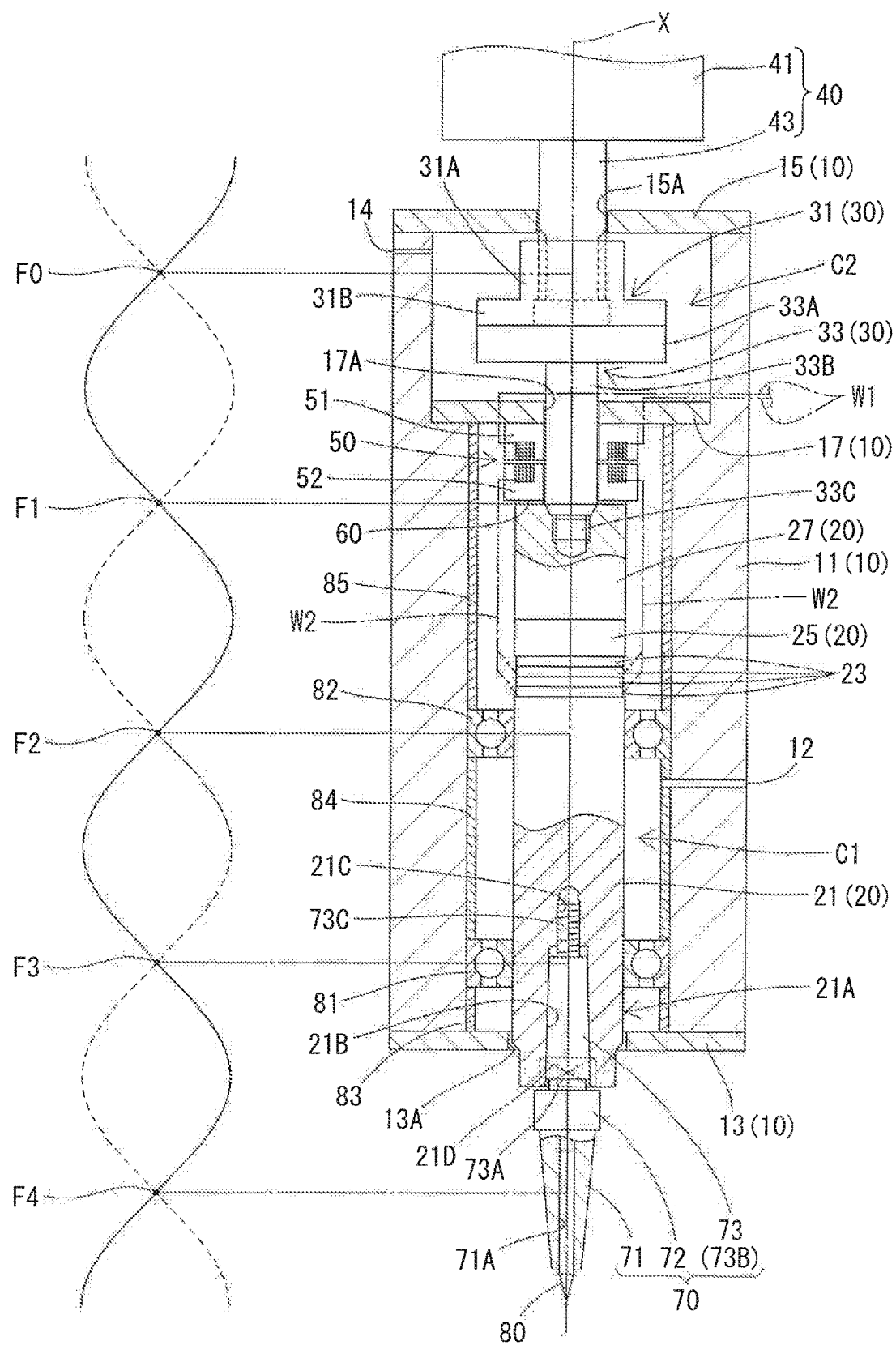
FIG. 1 is a cross-sectional view showing an ultrasonic vibration processing device according to a first embodiment, together with a conceptual view showing a vibration wave of an ultrasonic vibrator.

As shown in FIG. 1, an ultrasonic vibration processing device according to the first embodiment includes a housing 10, an ultrasonic vibrator 20, a connecting portion 30, a motor 40 as a rotational driving unit, a non-contact power supply unit 50, a reflecting member 60, and a tool holder 70.

The housing 10 includes a housing body 11 having a cylindrical shape, cover members 13 and 15 attached to respective ends of the housing body 11, and a fixing member 17 attached inside the housing body 11 and fixing a primary transformer 51 described later inside the housing body 11. The housing body 11 includes a first storage portion C1 for storing the ultrasonic vibrator 20, the non-contact power supply unit 50 and others described later, and a second storage portion C2 for storing a spline bearing 31 and a part of a joint portion 33 constituting the connecting portion 30 described later. The second storage portion C2 is continuous with a rear of the first storage portion C1 via a step extending outward. (The front-rear direction corresponds to the down-up direction in FIG. 1; this definition is applicable to the following description.) An inside space of the first storage portion C1 has a columnar shape. A side surface of the first storage portion C1 is formed with a first air hole 12 through which air flows in. An inside space of the second storage portion C2 has a columnar shape having a larger diameter than that of the shape of the inside space of the first storage portion C1. A side surface of the second storage portion C2 is formed with a second air hole 14 through which air flows out. The air is allowed to flow in through the first air hole 12 and flow out through the second air hole 14, thereby suppressing temperature rise inside the housing 10 caused by heat generated from the ultrasonic vibrator 20 which is supported within the housing 10 so as to be rotatable around a rotation axis X as described later.

A central portion of the cover member 13 attached to the front end of the housing body 11 is provided with an opening 13A having a circular shape. The opening 13A has an inner diameter slightly larger than an outer diameter of a front end portion of the ultrasonic vibrator 20 described later, so that a clearance is provided between the opening 13A and the front end portion of the ultrasonic vibrator 20. Air inside the housing 10 is allowed to flow out through the clearance. According to this configuration, temperature rise inside the housing 10 can be suppressed. A central portion of the cover member 15 attached to the rear end of the housing body 11 is provided with an opening 15A having a circular shape. The opening 15A has an inner diameter slightly larger than an outer diameter of a drive shaft 43 of the motor 40 described later. The fixing member 17 has a disk shape, and a central portion thereof is provided with an opening 17A having a circular shape. An outer diameter of the fixing member 17 is substantially equal to an inner diameter of the second storage portion C2. The opening 17A of the fixing member 17 has an inner diameter slightly larger than an outer diameter of a shaft portion 33B of the joint portion 33 of the connecting portion 30 described later. The fixing member 17 is engaged with a step portion provided at a boundary between the second storage portion C2 and the first storage portion C1, thereby being attached inside the housing body 11.

Figure 2:
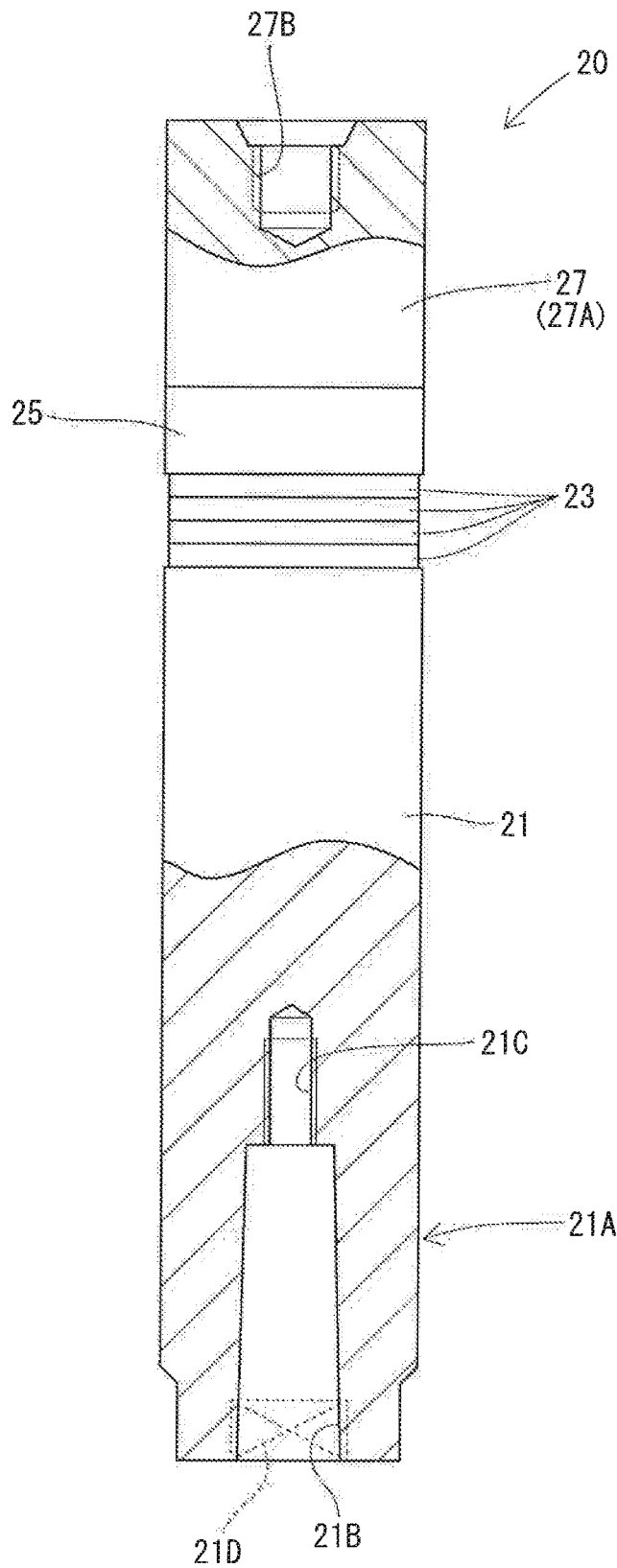
FIG. 2 is a partial cross-sectional view showing the ultrasonic vibrator of the first embodiment.

As shown in FIGS. 1 and 2, the ultrasonic vibrator 20 includes a main body 21, four piezoelectric elements 23, a holding portion 25, and a tightening portion 27. The main body 21 includes a horn portion 21A having a distal end portion to which the tool holder 70 is detachably attached. The piezoelectric elements 23 are stacked and disposed at the rear of a rear end of the main body 21. The holding portion 25 is disposed at the rear of a rear end of the piezoelectric elements 23. The tightening portion 27 is disposed at the rear of a rear end of the holding portion 25 and holds the piezoelectric elements 23 and the holding portion 25 between the main body 21 and the tightening portion 27. Each of the main body 21, the holding portion 25, and the tightening portion 27 is made of stainless steel.

The main body 21 has a substantially columnar shape. Two opposite surfaces 21D at a distal end portion of the main body 21 are cut into flat surfaces to be held by a tool such as a spanner. In the horn portion 21A formed in a distal end portion of the main body 21, an insertion hole 21B is formed extending rearward on the central axis and opened forward. An inner side surface of the insertion hole 21B is formed as an inclined surface such that diameter of the insertion hole 21B is slightly reduced toward a depth direction. The insertion hole 21B is formed with a female screw portion 21C which is continued from a central portion of a bottom surface of the insertion hole 21B and extends rearward on the central axis furthermore, the main body 21 is formed with a female screw portion (not shown) which is opened rearward at a central portion of a rear end of the main body 21 and extends forward on the central axis from the rear end.

Each of the piezoelectric elements 23 has an annular shape having an outer diameter slightly smaller than the diameter of the main body 21, and four piezoelectric elements 23 are stacked. An inner diameter of each of the piezoelectric elements 23 is larger than an outer diameter of a shaft portion (not shown) of the tightening portion 27 described later. The holding portion 25 has an annular shape having the same outer diameter as the outer diameter of the main body 21. An inner diameter of the holding portion 25 is larger than an outer diameter of a shaft portion (not shown) of the tightening portion 27 described later. The tightening portion 27 is constituted of a tightening main body 27A and a shaft portion (not shown). The tightening main body 27A has a shape obtained by cutting two opposite surfaces of a columnar body having an outer diameter slightly larger than each diameter of the main body 21 and the holding portion 25 into a flat surface. Accordingly, the tightening main body 27A of the tightening portion 27 can be held by a tool such as a spanner and rotated. The tightening main body 27A is formed with a female screw portion 27B opened rearward at a central portion of a rear end of the tightening main body 27A and extending forward on the central axis of the tightening main body. A shaft portion (not shown) extends forward on the central axis from a central portion of a front surface of the tightening main body 27A. A distal end of the shaft portion (not shown) is formed with a male screw portion.

In the ultrasonic vibrator 20 having the above configuration, the four stacked piezoelectric elements 23 are disposed at the rear end of the main body 21, and the holding portion 25 is disposed at the rear end of the piezoelectric elements 23. In this state, the shaft portion (not shown) of the tightening portion 27 is inserted into the holding portion 25 and the four piezoelectric elements 23, and the male screw portion formed in the shaft portion (not shown) of the tightening portion 27 is screwed into the female screw portion (not shown) opened at the rear end of the main body 21. As a result, the ultrasonic vibrator 20 is constructed in such a manner that the center axes of the main body 21, the four piezoelectric elements 23, the holding portion 25, and the tightening portion 27 are arranged on one straight line. As shown in FIG. 1, the ultrasonic vibrator 20 is constructed such that the rear end of the ultrasonic vibrator 20 (the rear end of the tightening portion 27) is located at a node F1 of ultrasonic vibration generated by the piezoelectric elements 23. According to this configuration, as will be described later, vibration generated by the piezoelectric elements 23 can be prevented from being easily transmitted to the secondary transformer 52 connected to the rear end of the ultrasonic vibrator 20.

The ultrasonic vibrator 20 is supported inside the housing 10 so as to he rotatable around the rotation axis X as described below.

The ultrasonic vibrator 20 is stored in the first storage portion C1 of the housing 10. In this case, a front end portion of the ultrasonic vibrator 20 protrudes from the opening 13A of the cover member 13 attached to the front end of the housing body 11. In the state where the ultrasonic vibrator 20 is thus disposed, the ultrasonic vibrator 20 is supported inside the housing 10 so as to be rotatable around the rotation axis X by two ball bearings 81 and 82 disposed at positions separated in the front-rear direction and between an inner wall surface of the first storage portion C1 and an outer circumferential surface of the main body 21 of the ultrasonic vibrator 20.

The two ball bearings 81 and 82 are disposed at positions corresponding to nodes F2 and F3, respectively, of ultrasonic vibration generated by the piezoelectric elements 23. In other words, the two ball bearings 81 and 82 are disposed apart from each other by a half wave length of the ultrasonic vibration. Accordingly, the two ball bearings 81 and 82 can support the ultrasonic vibrator 20 in a rotatable state without receiving vibration in the rotation axis X direction generated by the piezoelectric elements 23, so that the ultrasonic vibrator 20 can be rotated in a preferable manner.

The ball bearing 81 disposed on the front side holds, between an outer ring of the ball bearing 81 and the cover member 13 attached to the front end of the housing body 11, a first spacer 83 having a cylindrical shape and in contact with the inner wall surface of the first storage portion C1. The ball bearings 81 and 82 hold, between their respective outer rings, a second spacer 84 having a cylindrical shape and in contact with the inner wall surface of the first storage portion C1. The ball bearing 82 disposed on the rear side holds, between an outer ring of the ball bearing 82 and the fixing member 17 attached inside the housing body 11, a third spacer 85 having a cylindrical shape and in contact with the inner wall surface of the first storage portion C1. The two ball bearings 81 and 82 are thus positioned.

Figure 3:
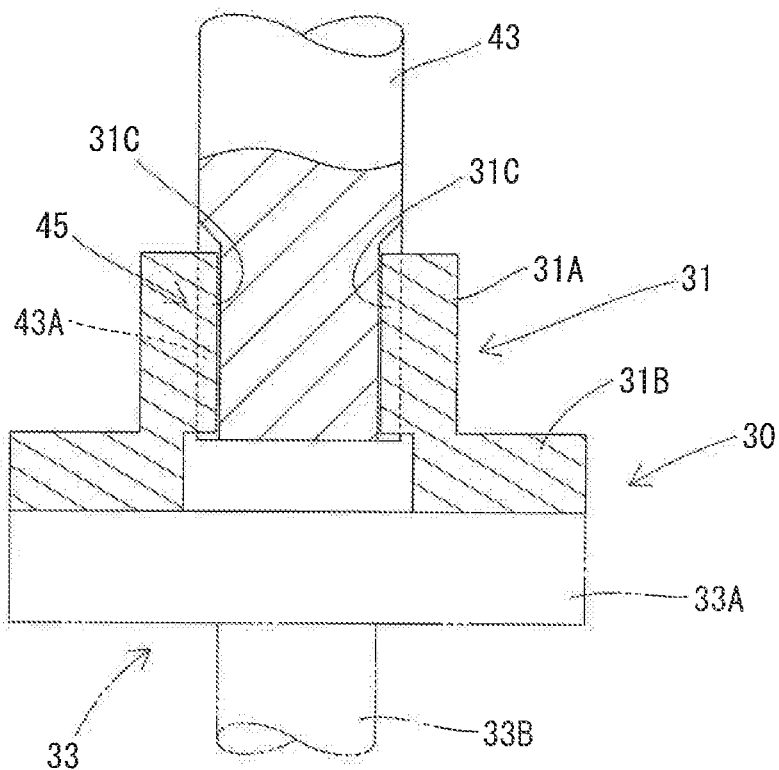
Figure 3:
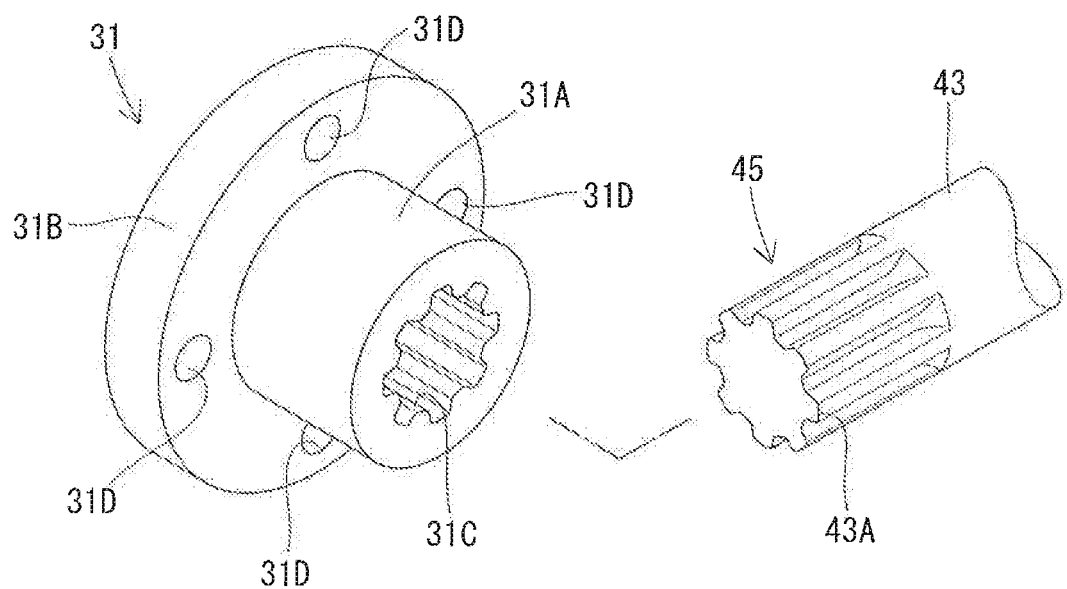

The connecting portion 30 is constituted of the joint portion 33 and the spline bearing 31 as shown in FIG. 1 and FIGS. 3(A) and 3(B). The joint portion 33 is made of a titanium alloy. The titanium alloy has a specific acoustic impedance different from that of stainless steel forming the tightening portion 27 and others of the ultrasonic vibrator 20. Accordingly, even when the connecting portion 30 is connected to the ultrasonic vibrator 20 as described later, a part of vibration generated by the ultrasonic vibrator 20 is reflected on the boundary between the joint portion 33 of the connecting portion 30 and the tightening portion 27 of the ultrasonic vibrator 20, so that the vibration is not easily transmitted toward the connecting portion 30. The spline bearing 31 is made of carbon steel. The joint portion 33 is constituted of a head portion 33A and a shaft portion 33B. The head portion 33A has a flat plate shape, and the external shape as viewed from the side where the shaft portion 33B extends is an octagonal shape obtained by cutting off corners of a square. The shaft portion 33B extends from a central portion of a front surface of the head portion 33A. The shaft portion 33B has a substantially columnar shape, and has a distal end portion having a reduced diameter and formed with a male screw portion 33C.

The spline bearing 31 is constituted of a bearing portion 31A and a flange portion 31B. The hearing portion 31A has a substantially cylindrical shape, and a through hole penetrating a center of the hearing portion 31A is formed such that an inner diameter of the front end portion is larger than the inner diameter on the rear side. In the bearing portion 31A, inner teeth 31C are formed on an inner circumferential surface of a portion with a small inner diameter. The inner circumferential surface of the bearing portion 31A where the inner teeth 31C are formed is coated with diamond-like carbon (DLC). The flange portion 31B has an annular shape extending outward from an outer circumferential edge of a front end of the bearing portion. The flange portion 31B includes four through holes 31D formed at equal intervals on an identical circumference. The spline bearing 31 and the joint portion 33 are connected by bolts (not shown) inserted through the through holes 31D.

The connecting portion 30 is stored inside the housing 10 so as to be rotatable around the rotation axis X together with the ultrasonic vibrator 20 as described below.

The connecting portion 30 is mainly stored in the second storage portion C2 of the housing 10. The shaft portion 33B of the joint portion 33 of the connecting portion 30 is inserted through the opening 17A of the fixing member 17 attached to the housing body 11 and through a through hole penetrating respective centers of a primary core 51A of the primary transformer 51 and a secondary core 52A of the secondary transformer 52 of the non-contact power supply unit 50 described later, and then the male screw portion 33C formed at the distal end portion of the shaft portion 33B of the joint portion 33 is screwed into the female screw portion 27B formed at a rear end of the tightening main body 27A of the ultrasonic vibrator 20. In this manner, the connecting portion 30 is connected to the ultrasonic vibrator 20, and stored inside the housing 10 so as to be rotatable around the rotation axis X.

As shown in FIG. 1, in a state where the connecting portion 30 is connected to the ultrasonic vibrator 20 and stored in the second storage portion C2, a central portion of the spline bearing 31 of the connecting portion 30 in the rotation axis X direction is located at a node F0 of ultrasonic vibration generated by the piezoelectric elements 23. Therefore, vibration of the spline bearing 31 in the rotation axis X direction is small, which can make it hard for the vibration to be transmitted to the motor 40 connected to the spline bearing 31 by the spline shaft 45 as described later.

As shown in FIG. 1, the motor 40 includes a motor body 41, and a drive shaft 43 projecting from the motor body 41. The motor 40 has a brake function. Accordingly, the motor 40 is capable of maintaining a constant holding torque. Outer teeth 43A are formed on an outer circumferential surface of a distal end portion of the drive shaft 43 as shown in FIGS. 3(A) and 3(B), thereby constituting the spline shaft 45. The outer circumferential surface of the spline shaft 45 is coated with DLC. The spline shaft 45 is inserted into the spline bearing 31 through an insertion opening opened at a rear end of the connecting portion 30 as shown in FIG. 1 and FIGS. 3(A) and 3(B). The motor 40 is connected to the connecting portion 30 in this manner.

As described above, the connecting portion 30 and the motor 40 are connected to each other by the spline bearing 31 and the spline shaft 45. Accordingly, although the connecting portion 30 is vibrated in the rotation axis X direction by the ultrasonic vibrator 20, the vibration is not easily transmitted to the motor 40. Furthermore, since the inner circumferential surface of spline bearing 31 and the outer circumferential surface of spline shaft 45 are coated with DLC friction between the spline bearing 31 and the spline shaft 45 is reduced, and abrasion resistance between the spline bearing 31 and spline shall 45 improves. Accordingly, the ultrasonic vibrator 20 and others in the ultrasonic vibration processing device can be rotated in a preferable manner for a long time.

Figure 4:
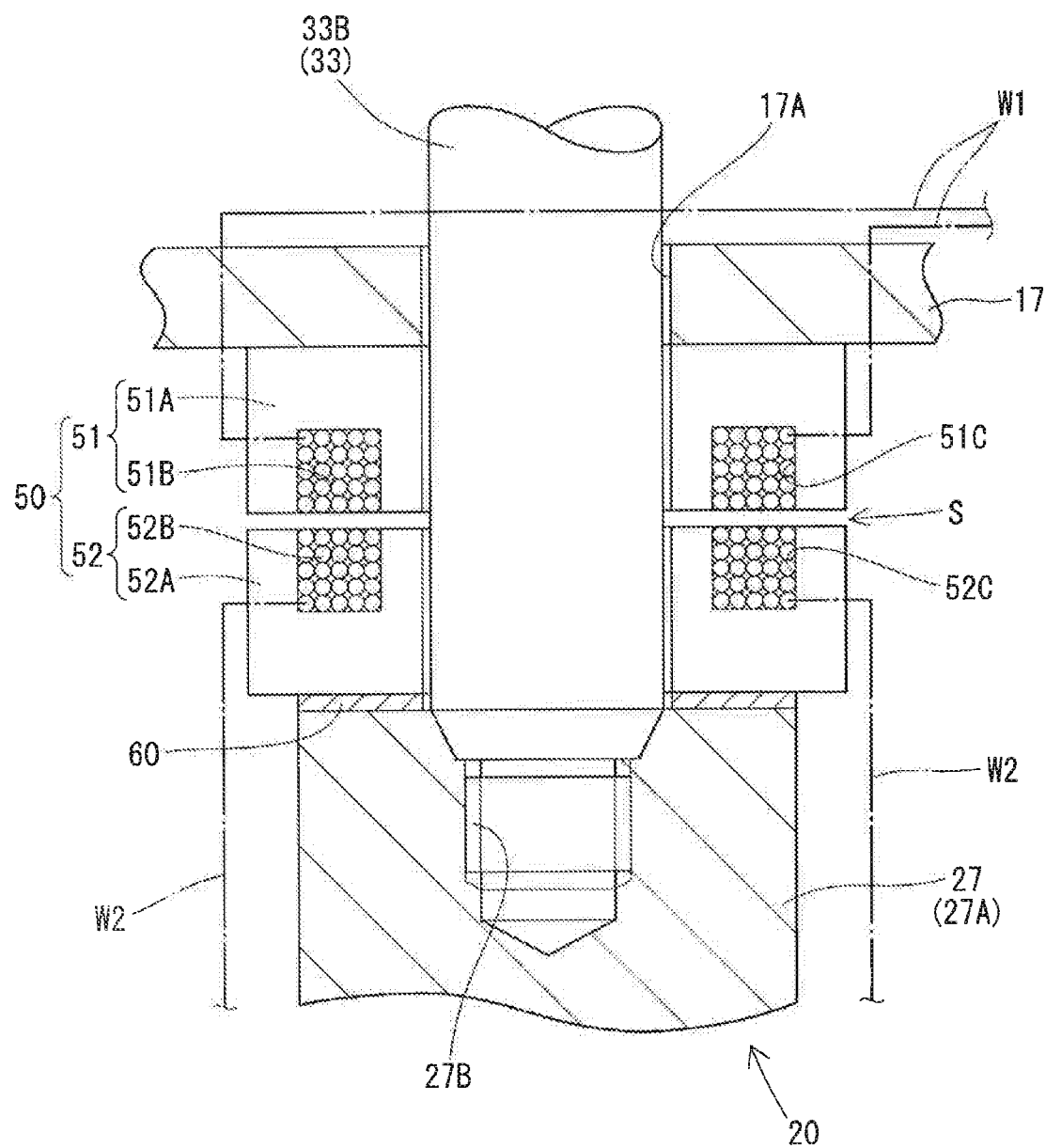
FIG. 4 is a partially enlarged cross-sectional view showing surroundings of a non-contact power supply unit in the ultrasonic vibration processing device according to the first embodiment.

As shown in FIGS. 1 and 4, the non-contact power supply unit 50 includes the primary transformer 51 and the secondary transformer 52. The primary transformer 51 includes the primary core 51A and a primary coil 51B. The primary core 51A has an annular shape, and a front surface thereof is formed with a groove 51C going round on a circumference of a circle. The primary coil 51B is wound in a number of rounds along the groove 51C of the primary core 51A. The primary coil 51B is connected to an external power supply via an electric wire W1, and receives high frequency power from the external power supply. The primary transformer 51 is fixed to a front surface of the fixing member 17 fixed inside the housing 10. In this case, the primary transformer 51 is fixed to the fixing member 17 such that a through hole penetrating a center of the primary core 51A is aligned with the opening 17A of the fixing member 17. Accordingly, a central axis of the primary core 51A and a center of the opening of the fixing member 17 are located on the rotation axis X.

The secondary transformer 52 includes the secondary core 52A and a secondary coil 52B. The secondary core 52A has an annular shape, and a rear surface of the secondary core 52A is formed with a groove 52C going round on a circumference of a circle. The secondary coil 52B is wound in a number of rounds along the groove 52C of the secondary core 52A. The secondary transformer 52 is connected to the rear end of the ultrasonic vibrator 20 which is supported inside the housing 10 so as to be rotatable around the rotation axis X, via the reflecting member 60 described later. In this state, a clearance S is formed between the primary transformer 51 and the secondary transformer 52. The secondary coil 52B is connected to the piezoelectric elements 23 via an electric wire W2. The secondary coil 52B supplies an induced electromotive force generated between itself and the primary coil 51B by electromagnetic induction, to the piezoelectric elements 23.

The reflecting member 60 is made of acrylic. Acrylic has a specific acoustic impedance different from that of stainless steel forming the tightening portion 27 and others of the ultrasonic vibrator 20. The reflecting member 60 is disk-shaped, and a through hole is formed at a central portion of the reflecting member 60. The reflecting member 60 has the same outer diameter as the outer diameter of the tightening main body 27A of the tightening portion 27 of the ultrasonic vibrator 20. An inner diameter of the through hole of the reflecting member 60 is slightly larger than an outer diameter of the shaft portion 33B of the joint portion 33 of the connecting portion 30. The reflecting member 60 is bonded to and held between the rear end of the ultrasonic vibrator 20 and the secondary transformer 52. Accordingly, the reflecting member 60 reflects vibration of the ultrasonic vibrator 20 toward the ultrasonic vibrator 20, which can make it hard for the vibration to be transmitted to the secondary transformer 52.

The tool holder 70 is constituted of a chuck portion 71, a connecting portion 72, and an insertion portion 73 as shown in FIG. 1. The chuck portion 71 has a truncated cone shape having a diameter reduced toward a distal end of the chuck portion 71, and has an insertion hole 71A formed on the central axis into which a tool 80 such as an end mill is inserted. The tool holder 70 is a shrink fit holder in which the tool is attached to the chuck portion 71 by shrink-fitting. The connecting portion 72 has a shape of a hexagonal column continuous with a rear end of the chuck portion 71. The insertion portion 73 is constituted of a first insertion portion 73A, a second insertion portion 73B, and a male screw portion 73C. The first insertion portion 73A has a columnar shape continuous with a rear end of the connecting portion 72. The first insertion portion 73A has an outer diameter smaller than an inner diameter of an opening of the insertion hole 21B formed in the horn portion 21A of the ultrasonic vibrator 20. The second insertion portion 73B has a truncated cone shape continuous with a rear end of the first insertion portion 73A, and has a diameter slightly reduced toward the rear. The male screw portion 73C is continuous with a central portion of a rear end of the second insertion portion 73B.

Tool replacement of the tool holder 70 can be automatically performed by a rotary driving device not-shown which is rotated in a state where the connecting portion 72 is inserted in a hexagonal hole formed in the rotary driving device from below so that the male screw portion 73C of the insertion portion 73 is tightened to or loosened from the female screw portion 21C of the insertion hole 21B formed in the horn portion 21A of the ultrasonic vibrator 20. In the automatic replacement of the tool, a torque for tightening the tool holder by the rotary driving device can be set constant by setting a holding torque of the motor to be constant. Thus, force (pressure) applied between the insertion hole 21B which is formed in the main body 21 of the ultrasonic vibrator 20 and formed with the inclined surface having the diameter slightly reduced toward the depth direction, and an outer side surface of the second insertion portion 73B of the insertion portion 73 of the tool holder 70 is set constant, with the result that adhesion force therebetween is set constant. Accordingly, transmission of ultrasonic vibration from the ultrasonic vibrator 20 to the tool holder 70 can be kept stable all the time. Furthermore, since the male screw portion 73C of the insertion portion 73 of the tool holder 70 and the female screw portion 21C of the insertion hole 21B formed in the horn portion 21A of the ultrasonic vibrator 20 are tightened with a constant torque all the time, the life of these portions can be prolonged. Furthermore, tool replacement can be performed in a shorter time than manual tool replacement.

As described above, the ultrasonic vibration processing device according to the first embodiment includes the housing 10, the ultrasonic vibrator 20, the connecting portion 30, the motor 40, and the non-contact power supply unit 50. The ultrasonic vibrator 20 includes the horn portion 21A and the piezoelectric elements 23. The horn portion 21A has the distal end to which the tool holder 70 is detachably attached. The piezoelectric elements 23 are held at an intermediate portion of the ultrasonic vibrator 20 in the rotation axis X direction. The ultrasonic vibrator 20 has the rear end located at the node F1 of ultrasonic vibration generated by the piezoelectric elements 23. Furthermore, the ultrasonic vibrator 20 is supported inside the housing 10 so as to be rotatable around the rotation axis X. The connecting portion 30 has the front end portion connected to the rear end portion of the ultrasonic vibrator 20. The connecting portion 30 is stored in the housing 10 so as to be rotatable around the rotation axis X together with the ultrasonic vibrator 20. Furthermore, the connecting portion 30 includes the spline bearing 31 having the insertion opening opened at the rear end of the connecting portion 30. The motor 40 includes the spline shaft 45 that is inserted into the spline bearing 31 through the insertion opening of the connecting portion 30 and rotatable around the rotation axis X, and the motor 40 is connected to the rear end portion of the connecting portion 30. The non-contact power supply unit 50 includes the primary transformer 51 and the secondary transformer 52. The primary transformer 51 is fixed to the housing 10. The primary transformer 51 includes the primary coil 51B that receives high frequency power from an external power supply. The secondary transformer 52 is connected to the rear end of the ultrasonic vibrator 20 with the clearance S maintained between the secondary transformer 52 and the primary transformer 51. The secondary transformer 52 is rotated around the rotation axis X together with the ultrasonic vibrator 20. Furthermore, the secondary transformer 52 includes the secondary coil 52B that supplies an induced electromotive force generated between the secondary coil 52B and the primary coil 51B by electromagnetic induction, to the piezoelectric elements 23.

In the ultrasonic vibration processing device, the rear end of the ultrasonic vibrator 20 is located at the node F1 of ultrasonic vibration generated by the piezoelectric elements 23, and the secondary transformer 52 is connected to the rear end of the ultrasonic vibrator 20. Since no amplitude in the rotation axis X direction is exhibited at each of the nodes F0 to F4 and the like of the ultrasonic vibration, the secondary transformer 52 of the ultrasonic vibration processing device is less likely to receive vibration in the rotation axis X direction. Accordingly, the clearance S between the primary transformer 51 and the secondary transformer 52 of the ultrasonic vibration processing device does not easily change. Therefore, the non-contact power supply unit 50 of the ultrasonic vibration processing device can supply high frequency power to the piezoelectric element 23 in a stable manner.

Furthermore, in the ultrasonic vibration processing device, the connecting portion 30 and the motor 40 are connected by the spline bearing 31 and the spline shaft 45. Therefore, although the connecting portion 30 is vibrated in the rotation axis X direction by the ultrasonic vibrator 20, this vibration is not easily transmitted to the motor 40. Accordingly, the motor 40 of the ultrasonic vibration processing device is not easily damaged by the vibration of the ultrasonic vibrator 20, and the motor 40 can rotate in a preferable manner for a long time. Furthermore, friction of the connecting portion 30 can be reduced and abrasion thereof can be suppressed, so that a downtime required for attending to the friction and abrasion can be shortened. Furthermore, in the ultrasonic vibration processing device, ultrasonic vibration is not transmitted to the motor 40, with the result that ultrasonic vibration energy generated by the piezoelectric elements 23 can be effectively transmitted to the tool.

Accordingly, the ultrasonic vibration processing device of the first embodiment can suppress vibration of the non-contact power supply unit 50 and the motor 40 which are components thereof due to the ultrasonic vibrator 20, and can perform processing using ultrasonic vibration in a preferable manner.

Furthermore, the spline bearing 31 of the ultrasonic vibration processing device is located at the node F0 of ultrasonic vibration generated by the piezoelectric elements 23. Since no amplitude in the rotation axis X direction is exhibited at each of the nodes F0 to F4 and others of the ultrasonic vibration, vibration of the spline bearing 31 in the rotation axis X direction is small. Accordingly, the vibration is not easily transmitted to the motor 40 connected to the spline bearing 31 via the spline shaft 45. Therefore, the ultrasonic vibration processing device can prevent damage to the motor 40 due to vibration of the ultrasonic vibrator 20 (e.g., damage of the bearing portion of the drive shaft 43), so that the motor 40 can rotate in a preferable manner for a long time.

Furthermore, in the ultrasonic vibration processing device, the inner circumferential surface of the spline bearing 31 and the outer circumferential surface of the spline shaft 45 are coated with DLC. Therefore, friction between the spline bearing 31 and the spline shaft 45 of the ultrasonic vibration processing device is reduced, and abrasion resistance between the spline bearing 31 and the spline shaft 45 improves. Accordingly, the ultrasonic vibrator 20 and others of the ultrasonic vibration processing device can be rotated in a preferable manner for a long time.

Furthermore, the ultrasonic vibration processing device includes the reflecting member 60 that is held between the rear end of the ultrasonic vibrator 20 and the secondary transformer 52 and has a specific acoustic impedance different from that of the tightening portion 27 and others of the ultrasonic vibrator 20. Therefore, in the ultrasonic vibration processing device, vibration is reflected toward the ultrasonic vibrator 20 by the reflecting member 60 held between the ultrasonic vibrator 20 and the secondary transformer 52, and is not easily transmitted to the secondary transformer 52. Accordingly, the secondary transformer 52 of the ultrasonic vibration processing device is less likely to receive vibration in the rotation axis X direction, so that the non-contact power supply unit 50 can supply high frequency power to the piezoelectric elements 23 in a stable manner.

Furthermore, in the ultrasonic vibration processing device, a specific acoustic impedance of the joint portion 33 of the connecting portion 30 and a specific acoustic impedance of the tightening portion 27 and others of the ultrasonic vibrator 20 are different from each other. Accordingly, a part of vibration generated by the ultrasonic vibrator 20 is reflected on the boundary between the joint portion 33 of the connecting portion 30 and the tightening portion 27 of the ultrasonic vibrator 20, so that the vibration is not easily transmitted toward the connecting portion 30. Accordingly, in the ultrasonic vibration processing device, vibration is not easily transmitted to the motor 40 so that damage due to the vibration is prevented, with the result that the motor 40 can rotate in a preferable manner for a long time.

The present invention is not limited to the first embodiment described above and depicted in the drawings. For example, following embodiments are also included in the technical scope of the present invention.

(1) In the first embodiment, the spline bearing is located at the node of the ultrasonic vibration generated by the piezoelectric elements. However, the spline bearing may not be located at the node.

(2) In the first embodiment, the inner circumferential surface of the spline bearing and the outer circumferential surface of the spline shaft are coated with DLC. However, other surface hardening treatment may be performed. Furthermore, surface hardening treatment may not be performed on the inner circumferential surface of the spline bearing and the outer circumferential surface of the spline shaft.

(3) In the first embodiment, the connecting portion and the drive shaft of the motor are connected by inserting the spline shaft formed at the distal end portion of the drive shaft into the spline bearing of the connecting portion. However, the connecting portion may include a cross-shaped recess like a head portion of a Phillips screw, and the drive shaft of the motor may include a distal end portion formed into a shape like a tip of a Phillips screwdriver, so that the distal end portion may be inserted into the recess to connect the connecting portion and the drive shaft of the motor.

(4) In the first embodiment, the reflecting member is held between the rear end of the ultrasonic vibrator and the secondary transformer. However, the reflecting member may not be held therebetween.

(5) In the first embodiment, the joint portion of the connecting portion is made of a titanium alloy. However, the joint portion may be made of an aluminum alloy. The aluminum alloy has a specific acoustic impedance different from that of stainless steel forming the tightening portion and others of the ultrasonic vibrator. Accordingly, a part of vibration generated by the ultrasonic vibrator is reflected on the boundary between the joint portion of the connecting portion and the tightening portion of the ultrasonic vibrator, so that the vibration is not easily transmitted toward the connecting portion.

(6) In the first embodiment, the tool holder is a shrink fit holder which shrink-fits the tool to the chuck portion. However, the tool holder may be a collet chuck.

(7) in the first embodiment, the end mill is attached to the tool holder. However, other cutting/grinding tools may be attached.

REFERENCE SIGNS LIST 10 housing
20 ultrasonic vibrator
21A horn portion
23 piezoelectric element
30 connecting portion
31 spline bearing
40 rotational driving unit (motor)
45 spline shaft
50 non-contact power supply unit
51 primary transformer
51B primary coil
52 secondary transformer
52B secondary coil
60 reflecting member
70 tool holder
F0, F1, F2, F3, F4 node
X rotation axis

The invention claimed is:

1. An ultrasonic vibration processing device comprising:
a housing;
an ultrasonic vibrator including a horn portion having a distal end portion to which a tool holder is detachably attached and a piezoelectric element held at an intermediate portion in a direction of a rotation axis, the ultrasonic vibrator having a rear end located at a node of ultrasonic vibration generated by the piezoelectric element, the ultrasonic vibrator being supported inside the housing so as to be rotatable around the rotation axis;
a connecting portion having a front end portion connected to a rear end portion of the ultrasonic vibrator, and stored in the housing so as to be rotatable around the rotation axis together with the ultrasonic vibrator;
a rotational driving unit connected to a rear end portion of the connecting portion; and
a non-contact power supply unit including a primary transformer and a secondary transformer, the primary transformer being fixed to the housing and including a primary coil that receives high frequency power from an external power supply, the secondary transformer being connected to the rear end of the ultrasonic vibrator with a clearance maintained between the secondary transformer and the primary transformer, the secondary transformer being configured to be rotated around the rotation axis together with the ultrasonic vibrator and including a secondary coil that supplies an induced electromotive force, generated between the secondary coil and the primary coil by electromagnetic induction, to the piezoelectric element.

2. The ultrasonic vibration processing device according to claim 1, further comprising a reflecting member that is held between the rear end of the ultrasonic vibrator and the secondary transformer and has a specific acoustic impedance different from a specific acoustic impedance of the ultrasonic vibrator.

3. The ultrasonic vibration processing device according to claim 2, wherein a specific acoustic impedance of the connecting portion and a specific acoustic impedance of the ultrasonic vibrator are different from each other.

4. The ultrasonic vibration processing device according to claim 1, wherein a specific acoustic impedance of the connecting portion and a specific acoustic impedance of the ultrasonic vibrator are different from each other.

5. The ultrasonic vibration processing device according to claim 1, wherein the connecting portion includes a spline bearing having an insertion opening opened at a rear end of the connecting portion and the rotational driving unit includes a spline shaft that is inserted into the spline bearing through the insertion opening of the connecting portion and rotatable around the rotation axis; and wherein the spline bearing is located at another node of ultrasonic vibration generated by the piezoelectric element.

6. An ultrasonic vibration processing device comprising:
a housing;
an ultrasonic vibrator including a horn portion having a distal end portion to which a tool holder is detachably attached and a piezoelectric element held at an intermediate portion in a direction of a rotation axis, the ultrasonic vibrator being supported inside the housing so as to be rotatable around the rotation axis;
a connecting portion having a front end portion connected to a rear end portion of the ultrasonic vibrator, and stored in the housing so as to be rotatable around the rotation axis together with the ultrasonic vibrator, the connecting portion including a spline bearing having an insertion opening opened at a rear end of the connecting portion;
a rotational driving unit including a spline shaft that is inserted into the spline bearing through the insertion opening of the connecting portion and rotatable around the rotation axis, the rotational driving unit being connected to a rear end portion of the connecting portion; and
a non-contact power supply unit including a primary transformer and a secondary transformer, the primary transformer being fixed to the housing and including a primary coil that receives high frequency power from an external power supply, the secondary transformer being connected to a rear end of the ultrasonic vibrator with a clearance maintained between the secondary transformer and the primary transformer, the secondary transformer being configured to be rotated around the rotation axis together with the ultrasonic vibrator and including a secondary coil that supplies an induced electromotive force, generated between the secondary coil and the primary coil by electromagnetic induction, to the piezoelectric element, and wherein the spline bearing is located at a node of ultrasonic vibration generated by the piezoelectric element.

7. The ultrasonic vibration processing device according to claim 6, wherein an inner circumferential surface of the spline bearing and an outer circumferential surface of the spline shaft are coated with DLC (Diamond-Like Carbon).

8. The ultrasonic vibration processing device according to claim 7, further comprising a reflecting member that is held between the rear end of the ultrasonic vibrator and the secondary transformer and has a specific acoustic impedance different from a specific acoustic impedance of the ultrasonic vibrator.

9. The ultrasonic vibration processing device according to claim 8, wherein a specific acoustic impedance of the connecting portion and a specific acoustic impedance of the ultrasonic vibrator are different from each other.

10. The ultrasonic vibration processing device according to claim 7, wherein a specific acoustic impedance of the connecting portion and a specific acoustic impedance of the ultrasonic vibrator are different from each other.

11. The ultrasonic vibration processing device according to claim 6, further comprising a reflecting member that is held between the rear end of the ultrasonic vibrator and the secondary transformer and has a specific acoustic impedance different from a specific acoustic impedance of the ultrasonic vibrator.

12. The ultrasonic vibration processing device according to claim 11, wherein a specific acoustic impedance of the connecting portion and a specific acoustic impedance of the ultrasonic vibrator are different from each other.

13. The ultrasonic vibration processing device according to claim 6, wherein a specific acoustic impedance of the connecting portion and a specific acoustic impedance of the ultrasonic vibrator are different from each other.

14. An ultrasonic vibration processing device comprising:
a housing;
an ultrasonic vibrator including a horn portion having a distal end portion to which a tool holder is detachably attached and a piezoelectric element held at an intermediate portion in a direction of a rotation axis, the ultrasonic vibrator being supported inside the housing so as to be rotatable around the rotation axis;
a connecting portion having a front end portion connected to a rear end portion of the ultrasonic vibrator, and stored in the housing so as to be rotatable around the rotation axis together with the ultrasonic vibrator, the connecting portion including a spline bearing having an insertion opening opened at a rear end of the connecting portion;
a rotational driving unit including a spline shaft that is inserted into the spline bearing through the insertion opening of the connecting portion and rotatable around the rotation axis, the rotational driving unit being connected to a rear end portion of the connection portion; and
a non-contact power supply unit including a primary transformer and a secondary transformer, the primary transformer being fixed to the housing and including a primary coil that receives high frequency power from an external power supply, the secondary transformer being connected to a rear end of the ultrasonic vibrator with a clearance maintained between the secondary transformer and the primary transformer, the secondary transformer being configured to be rotated around the rotation axis together with the ultrasonic vibrator and including a secondary coil that supplies an induced electromotive force, generated between the secondary coil and the primary coil by electromagnetic induction, to the piezoelectric element, and wherein an inner circumferential surface of the spline bearing and an outer circumferential surface of the spline shaft are coated with DLC (Diamond-Like Carbon).

15. The ultrasonic vibration processing device according to claim 14, further comprising a reflecting member that is held between the rear end of the ultrasonic vibrator and the secondary transformer and has a specific acoustic impedance different from a specific acoustic impedance of the ultrasonic vibrator.

16. The ultrasonic vibration processing device according to claim 15, wherein a specific acoustic impedance of the connecting portion and a specific acoustic impedance of the ultrasonic vibrator are different from each other.

17. The ultrasonic vibration processing device according to claim 14, wherein a specific acoustic impedance of the connecting portion and a specific acoustic impedance of the ultrasonic vibrator are different from each other.

\* \* \* \* \*